(12) United States Patent
Saboonchi et al.

(10) Patent No.: US 11,391,698 B2
(45) Date of Patent: Jul. 19, 2022

(54) DOME-SHAPE TUNING FORK TRANSDUCERS FOR CORROSION MONITORING

(71) Applicant: MISTRAS Group, Inc., Anchorage, AK (US)

(72) Inventors: Hossain Saboonchi, Princeton Junction, NJ (US); Edward Lowenhar, Princeton Junction, NJ (US); Miguel A. Gonzalez Nunez, Princeton Junction, NJ (US); David Carlson, Princeton Junction, NJ (US)

(73) Assignee: Mistras Group, Inc., Princeton Junction, NJ (US)

( * ) Notice: Subject to any disclaimer, the term of this patent is extended or adjusted under 35 U.S.C. 154(b) by 49 days.

(21) Appl. No.: 16/774,701

(22) Filed: Jan. 28, 2020

(65) Prior Publication Data

US 2020/0240954 A1    Jul. 30, 2020

Related U.S. Application Data

(60) Provisional application No. 62/797,834, filed on Jan. 28, 2019.

(51) Int. Cl.
| | |
|---|---|
| *G01N 29/02* | (2006.01) |
| *F17D 5/06* | (2006.01) |
| *G01N 29/32* | (2006.01) |
| *G01N 17/04* | (2006.01) |
| *G01N 29/22* | (2006.01) |

(52) U.S. Cl.
CPC ............. *G01N 29/022* (2013.01); *F17D 5/06* (2013.01); *G01N 17/04* (2013.01); *G01N 29/223* (2013.01); *G01N 29/326* (2013.01)

(58) Field of Classification Search
CPC .. G01N 29/022; G01N 29/326; G01N 29/223; G01N 29/30; G01N 29/036; G01N 2291/0258; G01N 2291/0427; G01N 2291/106; F17D 5/06
USPC .............................................................. 73/86
See application file for complete search history.

(56) References Cited

U.S. PATENT DOCUMENTS

| | | | | |
|---|---|---|---|---|
| 3,085,168 | A * | 4/1963 | Jones | ........................ G10G 7/02 |
| | | | | 310/25 |
| 2007/0003450 | A1 * | 1/2007 | Burdett | ................... C08F 10/00 |
| | | | | 422/108 |

(Continued)

*Primary Examiner* — Tarun Sinha
(74) *Attorney, Agent, or Firm* — Norton Rose Fulbright US LLP

(57) ABSTRACT

Embodiments of tuning fork-based sensors are disclosed. The sensors may include a measurement sensor that includes a diaphragm disposed on a proximal end and a plurality of forks extending from the diaphragm toward the distal end of the sensor. The diaphragm may have a domed geometry defining a curved surface. The plurality of forks may extending from the curved surface of the diaphragm toward the distal end and each of the plurality of forks may include a stub portion connected to the diaphragm, a stem portion, and a paddle portion. Some sensors, such as measurement sensors, may include a stem portion formed from a corrosive material. A reference sensor may be provided to compensate for changes in frequency measurements due to temperature, viscosity, or other environmental factors present in the environment where the sensors are deployed.

20 Claims, 13 Drawing Sheets

(56) References Cited

U.S. PATENT DOCUMENTS

| | | | |
|---|---|---|---|
| 2007/0199379 A1* | 8/2007 | Wolf | G01N 17/04 73/590 |
| 2012/0198923 A1* | 8/2012 | Wolf | B23K 15/0093 73/86 |
| 2015/0106036 A1* | 4/2015 | Kumaran | G01N 17/04 702/34 |

* cited by examiner

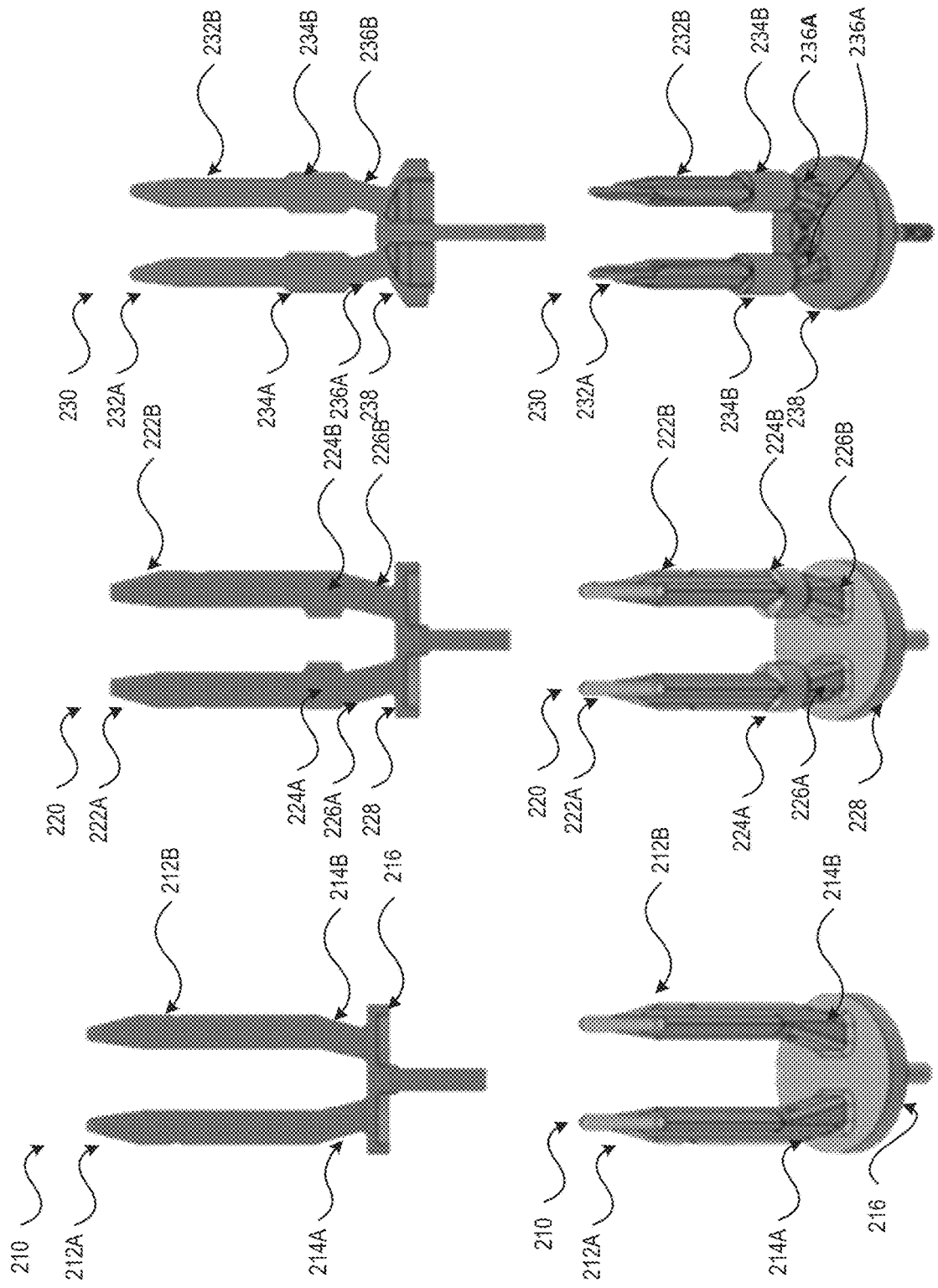

DOME-SHAPE TUNING FORK TRANSDUCERS FOR CORROSION MONITORING

CROSS REFERENCE TO RELATED APPLICATION

The present application claims priority from U.S. Provisional Patent Application No. 62/797,834, filed Jan. 28, 2019, which is hereby incorporated by reference in its entirety.

TECHNICAL FIELD

The present application is directed toward devices and methods which are utilized in corrosion monitoring. More specifically, the present application provides for improved tuning fork-based sensors to monitor pipe corrosion.

BACKGROUND

On-line monitoring of industrial processes has always presented challenges. Emphasis has been given to the monitoring of internal corrosion of pipes utilized in industrial processes. One of the main reasons on-line monitoring is important, and is often required, is because it can allow for a process plant to operate for longer periods between scheduled shut-downs, avoid unscheduled stoppages, increase management efficiency and most importantly, reduce incidents resulting in hazard or injury to both plant personnel and the general public. These requirements have become a reality and are applied to oil and gas production as well as production of chemicals and petrochemicals.

Given the increased need to have more reliable and effective monitoring devices, a number of tools and components have been developed throughout the years. Devices such as corrosion coupons have been used with a limited success in real-time monitoring. One cause is the slow response time to detect rapid changes in the corrosivity of a process, especially when working in very dynamic environments, for example, the processing of raw materials under varying operation conditions. When localized corrosion is a concern, it cannot be guaranteed that this phenomenon initiates on the coupons before these are removed, even with extended test durations. On the other hand, the calculated corrosion rate of the coupon cannot be translated directly into the corrosion rate of the equipment, unless it is correlated with ultrasonic thickness measurements and by comparison of the corrosion rate with the calculated rate for equivalent coupons. Certain forms of corrosion cannot be detected with corrosion coupons as is the case where erosion-corrosion takes place, because of the coupons' tendency to shield one another from the effects of process turbulence and heat transfer effects.

Electric resistance (ER) probes measure the remaining average metal thickness. In order to obtain the corrosion rate, a series of measurements is made over a period of time, and the results are plotted as a function of exposure time. The corrosion rate can be determined from the slope of the resulting plot. ER probes can be used in almost any environment because their response does not depend on the environment. The electrical resistance is only measured from the remaining metal and the conductivity of the corrosive environment is usually inconsequential. ER probes have limited applicability, particularly when dealing with highly conductive environments such as molten salts, which are liquid metals which will affect the resistance measurement of the remaining metal. On the other hand, sometimes is not possible to take measurements at the probe site with a portable bridge as the temperature compensation device reacts slowly, and it can be a source of error if the temperature varies when the measurement is taken. Finally, corrosion rate measurements obtained in short periods of time can be inaccurate because the method measures only the remaining metal, not the rate of attack; this increases the signal-to-noise ratio in short exposures and it does not provide information on localized attack.

Tuning forks have been utilized to sense corrosion in pipelines in the oil and gas industry. In operation, a tuning fork will usually be configured such that the oscillator increases its resonant frequency in response to mass loss. This change in frequency can be measured and utilized to monitor pipe corrosion. More recently some tuning forks have been implemented that utilize a corrodible element located along the length of the fork. However, these tuning forks are not sufficiently robust in common environments of the field when under certain temperature and pressure stresses.

SUMMARY

The present application provides systems, methods and devices which utilize a tuning fork having corrodible elements. Such tuning forks may be used in on-line corrosion monitoring applications within pipes. Embodiments have made multiple improvements over existing devices. For example, embodiments may use a domed shape diaphragm as opposed to a flat diaphragm at the base of the tuning fork. Additional geometric changes may also be present, for example, embodiments may also significantly increase the size and change the geometry of the corrodible elements. Such improvements of devices provide significant advancements over prior art devices in terms of pressure resistance and life span, while keeping the corrosion rate sensitivity at the same level, and reducing the thermal effect sensitivity of the device. More specifically, devices have been provided that are able to operate at temperatures between −40° C. to 540° C. and pressures up to 1440 (psi at room temperature: Class of #600 flanges). Further, some embodiments have operated at pressures up to 7000 psi without any noticeable change in performance.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which:

FIGS. 2A, 2B, and 2C illustrate cross section and perspective views of reference sensors and measurement sensors according to embodiments of the present disclosure;

DETAILED DESCRIPTION

The detailed description set forth below, in connection with the appended drawings and presentations, is intended as a description of various possible configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

Figure 1:
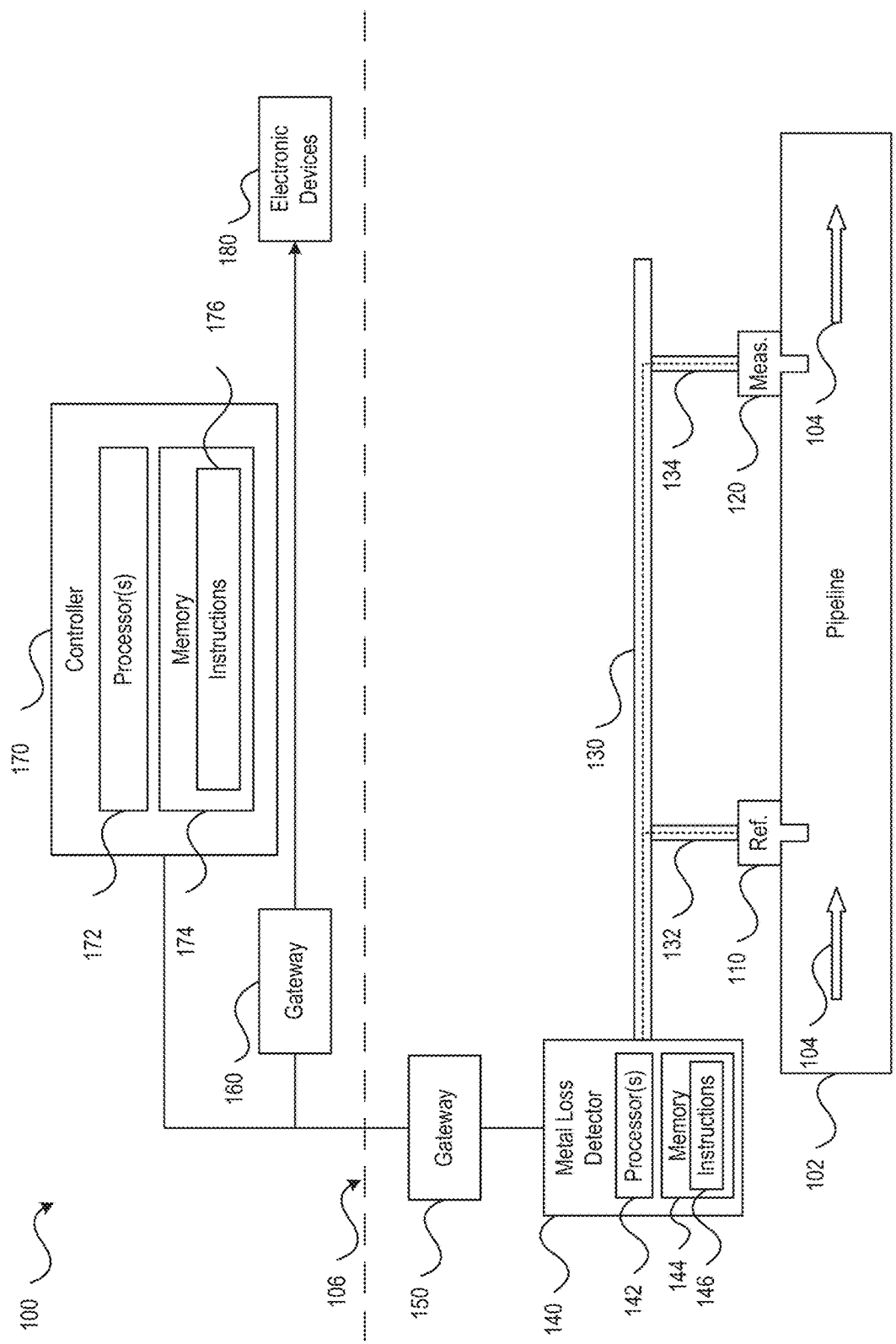
FIG. 1 is a block diagram illustrating a system for monitoring corrosion according to embodiments of the present disclosure.

Referring to FIG. 1, a block diagram illustrating a system for monitoring corrosion according to embodiments of the present disclosure is shown as a system 100. The system 100 may be configured to detect corrosion of materials used to transport fluids, gases, and/or other substances or for other applications where corrosion may occur (e.g., marine applications involving corrosion of ship components, etc.). As shown in FIG. 1, the exemplary system 100 includes a pipeline 102, a reference sensor 110, a measurement sensor 120, a metal loss detector 140, gateways 150, 160, a controller 170, and one or more electronic devices 180. It is noted that although FIG. 1 illustrates the system 100 as including the pipeline 102, operations of the system 100 for detecting corrosion of a metal may be utilized to detect corrosion of materials other than pipelines (e.g., storage containers, ship hulls, and the like). Thus, it is to be understood that pipeline 102 is provided for purposes of illustration, rather than by way of limitation.

The pipeline 102 may be configured to transport a liquid (e.g., oil, liquid natural gas (LNG), and the like), a gas (e.g., methane, nitrogen, etc.), or a combination of liquids and gases from a source (e.g., a well) to a destination (e.g., a refinery, a storage container, etc.). As illustrated in FIG. 1, a flow direction 104 indicates a direction in which substances travel through the pipeline 102. The reference sensor 110 and the measurement sensor 120 may be configured such that at least a portion of the reference sensor 110 and the measurement sensor 120 are disposed at least partially within an interior space of the pipeline 102. In such an arrangement, the portion of the reference sensor 110 and the measurement sensor 120 disposed at least partially within the interior space of the pipeline 102 may be exposed to the substance(s) travelling through the pipeline 102 in the flow direction 104, which may enable the reference sensor 110 and the measurement sensor 120 to generate sensor data that may be used to detect and/or measure corrosion occurring within the pipeline 102. It is noted that a system, such as the system 100, may include a plurality of reference sensors 110 and measurement sensors 120. For example, in applications where the reference sensor 110 and the measurement sensor 120 are utilized with a pipeline, such as the pipeline 102, reference sensors and measurement sensors may be provided at various locations along the pipeline to enable monitoring of corrosion occurring within the pipeline in real-time.

The reference sensor 110 and the measurement sensor 120 may be communicatively coupled to the metal loss device 140 via one or more wired or wireless communication links. In FIG. 1, the reference sensor 110 and the measurement sensor 120 are shown as being communicatively coupled to the metal loss device 140 via wired communication links. As shown in FIG. 1, where wired communication links are utilized to communicatively couple the reference sensor 110 and the measurement sensor 120 to the metal loss device 140, wires providing the wired communication links may be contained within a conduit 130. In an aspect, a portion of the conduit may be flexible, such as conduit portions 132, 134. In some embodiments, a combination of wired and wireless communication links may be utilized. For example, wired communication links may be provided to communicatively couple the reference sensor 110 and the measurement sensor 120 to a wireless access point (WAP) or other device configured to facilitate wireless communication (e.g., a cellular communication device or network, etc.) and the wireless communication device may be configured to relay the sensor data generated by the reference sensor 110 and the measurement sensor 120 to the metal loss device 140.

The metal loss device 140 may be configured to detect corrosion based sensor data provided by the reference sensor 110 and the measurement sensor 120. As illustrated in FIG. 1, the metal loss device 140 may include one or more processors 142 and a memory 144. Each of the one or more processors 142 may be a central processing unit (CPU) or other computing circuitry (e.g., a microcontroller, one or more application specific integrated circuits (ASICs), and the like) and may have one or more processing cores. The memory 144 may include read only memory (ROM) devices, random access memory (RAM) devices, one or more hard disk drives (HDDs), flash memory devices, solid state drives (SSDs), other devices configured to store data in a persistent or non-persistent state, or a combination of different memory devices. The memory 144 may further store instructions 146 that, when executed by the one or more processors 142, cause the one or more processors 142 to perform the operations described herein with respect to the metal loss device 140. In some aspects, operations of the metal loss device 140 may be performed by another device, such as the controller 170, the electronic device 180, or another device.

Referring briefly to FIGS. 2A-2C, images shown a cross section and perspective view of reference sensors and measurement sensors according to embodiments of the present disclosure are shown. In particular, FIG. 2A illustrates a structure of a reference sensor 230 according to embodiments of the present disclosure, while FIGS. 2B and 2C illustrate different structures for measurement sensors 220 (FIG. 2B) and 230 (FIG. 2C).

As shown in FIG. 2A, the reference sensor 210 may include a diaphragm 216, a plurality of forks extending from the curved surface of the diaphragm 216 toward the distal end of the reference sensor 210. Each fork of the reference sensor includes a stub portion 214A, 214B connected to the diaphragm 216 and a paddle portion 212A, 212B disposed on a proximal end of The reference sensor 210 may be configured for insertion into a pipe system (e.g., the pipeline 102 of FIG. 1) and to provide reference data to a loss detector circuit (e.g., the metal loss device 140 of FIG. 1) while the pipe system is in use.

As shown in FIG. 2B, the measurement sensor 220 may include a diaphragm 228 disposed on a proximal end of the measurement sensor 220. The measurement sensor 220 also includes a plurality of forks extending from the surface of the diaphragm 228 toward the distal end of the measurement sensor 220. Each fork of the measurement sensor 220 may include a stub portion 226A, 226B connected to the diaphragm 228, a stem portion 224A, 224B, and a paddle portion 222A, 222B. The stem portion 224A, 224B of the measurement sensor 220 may be formed from a corrosive material, such as carbon steel or another corrosive material. In an aspect, the corrosive portion (e.g., the stem portion) may be configured to mimic a material of a pressure containment boundary associated with an environment in which the measurement sensor 220 is deployed. For example, if the measurement sensor 220 is deployed in a pipeline (e.g., the pipeline 102 of FIG. 1), the corrosive stem may be formed of a same material used to form the pipeline or a substance configured to mimic the corrosive properties of the material from which the pipeline is formed. By configuring the corrosive stem portion using the same material or a material that mimics the corrosive properties of the pressure containment boundary (e.g., the pipeline, etc.), the measurement sensor 220 may be configured to provide sensor data that accurately tracks corrosion of the pressure containment boundary.

As shown in FIG. 2B, the measurement sensor 230 may include a diaphragm 238 disposed on a proximal end of the measurement sensor 230. The measurement sensor 230 also includes a plurality of forks extending from the surface of the diaphragm 238 toward the distal end of the measurement sensor 230. Each fork of the measurement sensor 230 may include a stub portion 236A, 236B connected to the diaphragm 238, a stem portion 234A, 234B, and a paddle portion 232A, 232B. The stem portion 234A, 234B of the measurement sensor 220 may be formed from a corrosive material, such as carbon steel, a low chrome (e.g., 5%-9%) metal, or another corrosive material. In an aspect, the corrosive portion (e.g., the stem portion) may be configured to mimic a material of a pressure containment boundary associated with an environment in which the measurement sensor 230 is deployed. For example, if the measurement sensor 230 is deployed in a pipeline (e.g., the pipeline 102 of FIG. 1), the corrosive stem may be formed of a same material used to form the pipeline or a substance configured to mimic the corrosive properties of the material from which the pipeline is formed. By configuring the corrosive stem portion using the same material or a material that mimics the corrosive properties of the pressure containment boundary (e.g., the pipeline, etc.), the measurement sensor 230 may be configured to provide sensor data that accurately tracks corrosion of the pressure containment boundary.

The diaphragms (e.g., the diaphragms 216, 228, 238) illustrated in FIGS. 2A-2C may have a flat geometry, as shown by diaphragms 216, 228 in FIGS. 2A and 2B, or may have a domed geometry defining a curved surface, as shown by diaphragm 238 in FIG. 2C. It is noted that the curved-dome shape diaphragm (e.g., diaphragm 238) may provide better distribution of stresses below a maximum yield stress and enable the sensor (e.g., the reference sensor and/or measurement sensor) to be utilized at higher operation pressures. In an aspect, the reference sensor 210 and the portions of the measurement sensors 220, 230 other than the corrosive stem portions 224A/224B, 234A/234B may be formed from stainless steel, a Hastelloy alloy, an Inconel alloy, a Monel alloy, or another non-corrosive material. In some aspect, the diaphragm, stub portions, and paddle portions (e.g., the non-corrosive portions of the forks) may be coated with a substance designed to mitigate corrosion.

As illustrated and described in more detail with reference to FIG. 1, the measurement sensors and reference sensors illustrated in FIGS. 2A-2C may be configured to be removably inserted into a pipe system (e.g., the pipeline 102 of FIG. 1) and to generate sensor data based on one or more substances (e.g., liquids, gases, etc.) flowing through the pipe system, one or more characteristics of the pipe system (e.g., temperature, pressure, and the like within the pipe system), or a combination of the substances and characteristics. The measurement sensors and reference sensors of FIGS. 2A-2C may be communicatively coupled to a loss detector circuit (e.g., the metal loss device 140) while the pipe system is in use and may provide the sensor data to the loss detector circuit in real-time or periodically according to a specified time period (e.g., 20 seconds, 1 minute, 5 minutes, 1 hour, 12 hours, 2 days, 1 week, etc.). Because the measurement and reference sensors are removably insertable into the pipe system, replacement of the measurement and reference sensors may be performed periodically (e.g., as the useful life of the measurement sensor deteriorates due to corrosion of the stub portions). It is noted that the reference sensors may have a longer lifespan due to the lack of the corrosive stub portions; however, the reference sensor may be replaced at the same time as the measurement sensor to ensure smooth operation of the system and mitigate the chances that a failure occurs.

Referring back to FIG. 1, as the substance passes through the pipeline 102, the reference sensor 110 and the measurement sensor 120 may generate and provide sensor data to the metal loss device 140. The sensor data may be generated as the tines of the reference sensor 110 and the measurement sensor 120 are exposed to the substance flowing through the pipeline and may be characteristic of the frequency at which the tines resonate (e.g., in response to exposure to the substance). Over time, the corrodible stem of the measurement sensor 120 may deteriorate due to corrosion resulting from the substance flowing through the pipeline 102. The corrosion of the corrodible stem of the measurement sensor 120 may induce changes to the resonance of the tines of the measurement sensor 120. The changes to the resonance of the tines may be used to detect corrosion within the pipeline 102. For example, the frequency response of the mass-spring system of the reference sensor 110 and the measurement sensor may obey Hooke's law in a simple harmonic oscillator relationship:

$$f = \frac{1}{2\pi}\sqrt{\frac{k}{m}}, \quad \text{(Equation 1)}$$

where f is the frequency response, k is a constant characteristic of the spring (e.g., the stiffness or elasticity of the spring), and m is the mass of the spring. The sensor data generated by the measurement sensor 120, which includes the corrodible stem, may experience frequency changes (e.g., changes to the vibration frequency of the tuning fork) as metal is lost from the corrodible stem due to corrosion, while the sensor data provided by the reference sensor 110 may not experience changes (e.g., because the measurement sensor 110 may not include a corrodible stem).

While the frequency of oscillating mass balances typically increases as mass is lost due to corrosion, the measurement sensor 120 described here experiences the opposite effect (e.g., the frequency at which the measurement sensor 120 oscillates decreases as mass decreases). This result is accomplished by having the spring constant (e.g., k in Equation 1 above) decrease as the corrodible stem of the measurement sensor 120 corrodes. This provides a significant advantage when used in typical industrial applications. To illustrate, the measurement sensor 120 (and reference sensor 110) is relatively immune to mass increase associated with build-up of scale (e.g. rust, iron sulfide, and the like). Scale may form as a result of oxidation of metal and is commonly produced during the corrosion process. For example, metal sulfide can be formed in the presence of corrosive sulfur species and metal carbonates can be formed during carbon dioxide induced corrosion, which may occur in some applications to which embodiments of the present disclosure may be utilized (e.g., pipeline transport of oil, gas, etc.). Mass increase from scale could potentially counteract metal lost during corrosion and confound corrosion measurements made with typical vibrating mass balances. However, for the measurement sensor 120 described herein, scale deposition has no appreciable stiffness compared to the metal and has no effect on the resonant frequency, thus having minimal impact on the sensor data generated by the measurement sensor 120. Further, frequency variations caused by changes in temperature, flow, and fluid viscosity may be compensated for using the reference sensor 110. The life of the measurement sensor 120 may related to the original thickness of the corrodible stem (e.g., at the time the measurement sensor 120 is deployed), which may retain good sensitivity (even for thicker bases needed to run 8-10 years before replacement). The present corrosion sensor (e.g., the measurement sensor 120) is thus improved over existing sensors by combining high sensitivity, long life and relative immunity from the effects of corrosive scale build-up.

The metal loss device 140 may be configured to determine an amount of metal loss based on the sensor data provided by the reference sensor 110 and the measurement sensor 120. For example, because the reference sensor 110 does not include a corrodible stem, changes to the frequency of resonance of the reference sensor 110 are based solely on changes in temperature, flow, and fluid viscosity, while the measurement sensor 120 experiences changes in resonance due to changes in temperature, flow, and fluid viscosity, as well as metal loss due to corrosion of the corrodible stem. To determine the amount of corrosion, a parameter indicative of corrosion may be derived based on a difference between the sensor data provided by the reference sensor 110 and the measurement sensor 120. In an aspect, the parameter indicative of corrosion (C) may be obtained by subtracting the resonance (R) of the reference sensor 110 from the resonance (M) of the measurement sensor 120 (e.g., $C_i = M_i - R_i$, for a point in time i).

Figure 3A:
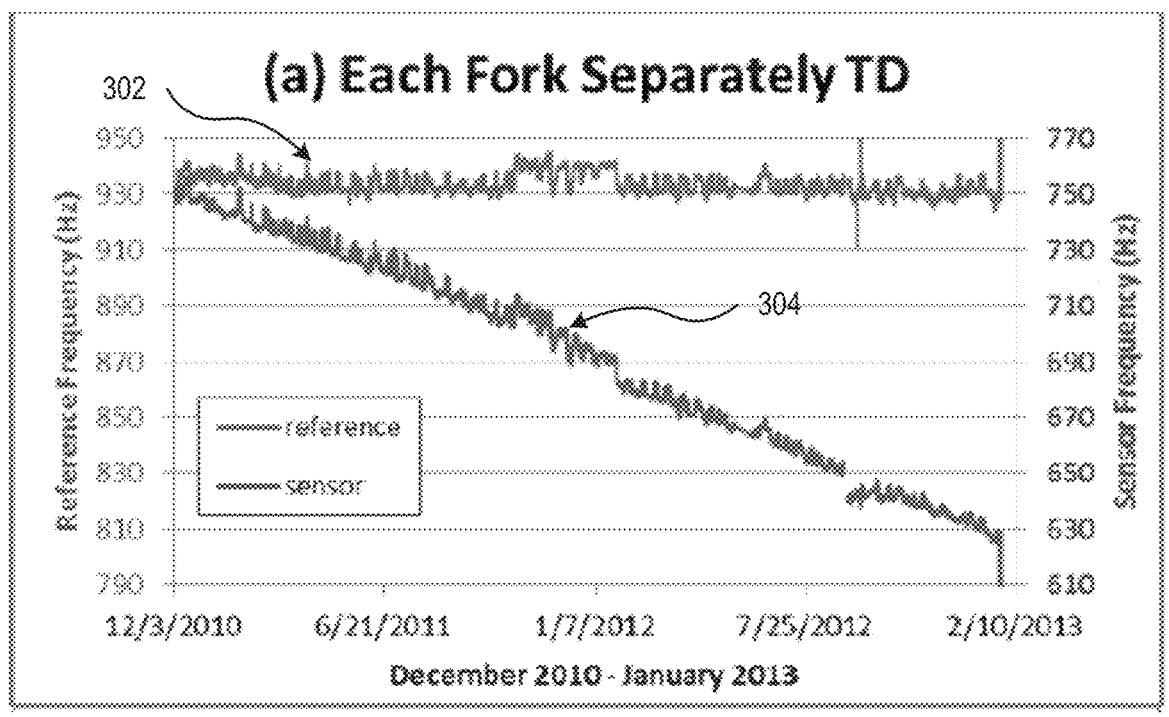
FIGS. 3A and 3B illustrate observations derived from an approximately two year period of a three year test according to embodiments of the present disclosure.
Figure 3B:
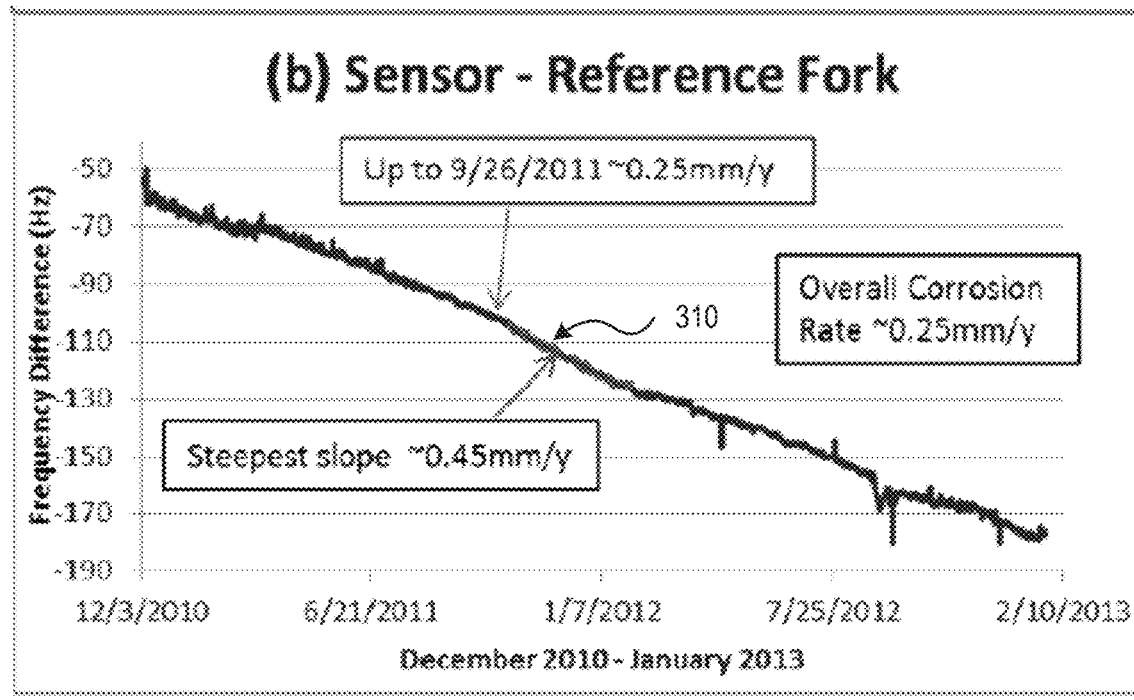

Calculating the parameter indicative of corrosion in the manner described above is illustrated by the graphs of FIGS. 3A and 3B. FIGS. 3A and 3B illustrate observations derived from an approximately two year period of a three year test. The test utilized a pair of tuning forks (e.g., a measurement sensor and a reference sensor similar to those illustrated in FIGS. 2A-2C). For example, a first tuning fork had a construction similar to the measurement sensors illustrated in FIGS. 2B and 2C and included a carbon steel corrodible element (or stem) and the second tuning fork had a construction similar to the reference sensor illustrated in FIG. 2A and was entirely made of stainless steel. The temperature for the test was approximately 315° C. and a fluid having reactive sulfur which would be corrosive to carbon steel at the test temperature. Although the service temperature was reasonably constant during the test, the fluid viscosity index, which provides a relative measure of change in viscosity with temperature variation, ranged from 100-850 during the testing period and was observed to change approximately every 3 to 5 days. The individual results from the reference and measurement sensors are shown in FIG. 3A. In FIG. 3A, distinct slopes for the two different sensors were observed, with the plot 302 corresponding to the reference sensor and the plot 304 corresponding to the measurement sensor. As can be seen in FIG. 3A, the measurement sensor was corroding (e.g., as indicated by the decreasing frequency measurements indicated by plot 304) and the reference sensor was not corroding (e.g., as indicated by the relatively consistent frequency measurements indicated by plot 302). Small variations in both trends were observed, which were attributable to the frequent viscosity changes. The difference between the frequencies of the reference and measurement sensors (e.g., the parameter indicative of corrosion) is shown in FIG. 3B. The reference probe reduces the variability attributable to viscosity changes. In FIG. 3B, the region 310 represents the highest corrosion rate observed during the testing period, which was approximately 18 mpy (0.45 mm/y). The time period in which the highest corrosion rate was observed corresponds to a change in test conditions where flow rate throughput was increased.

Figure 4:
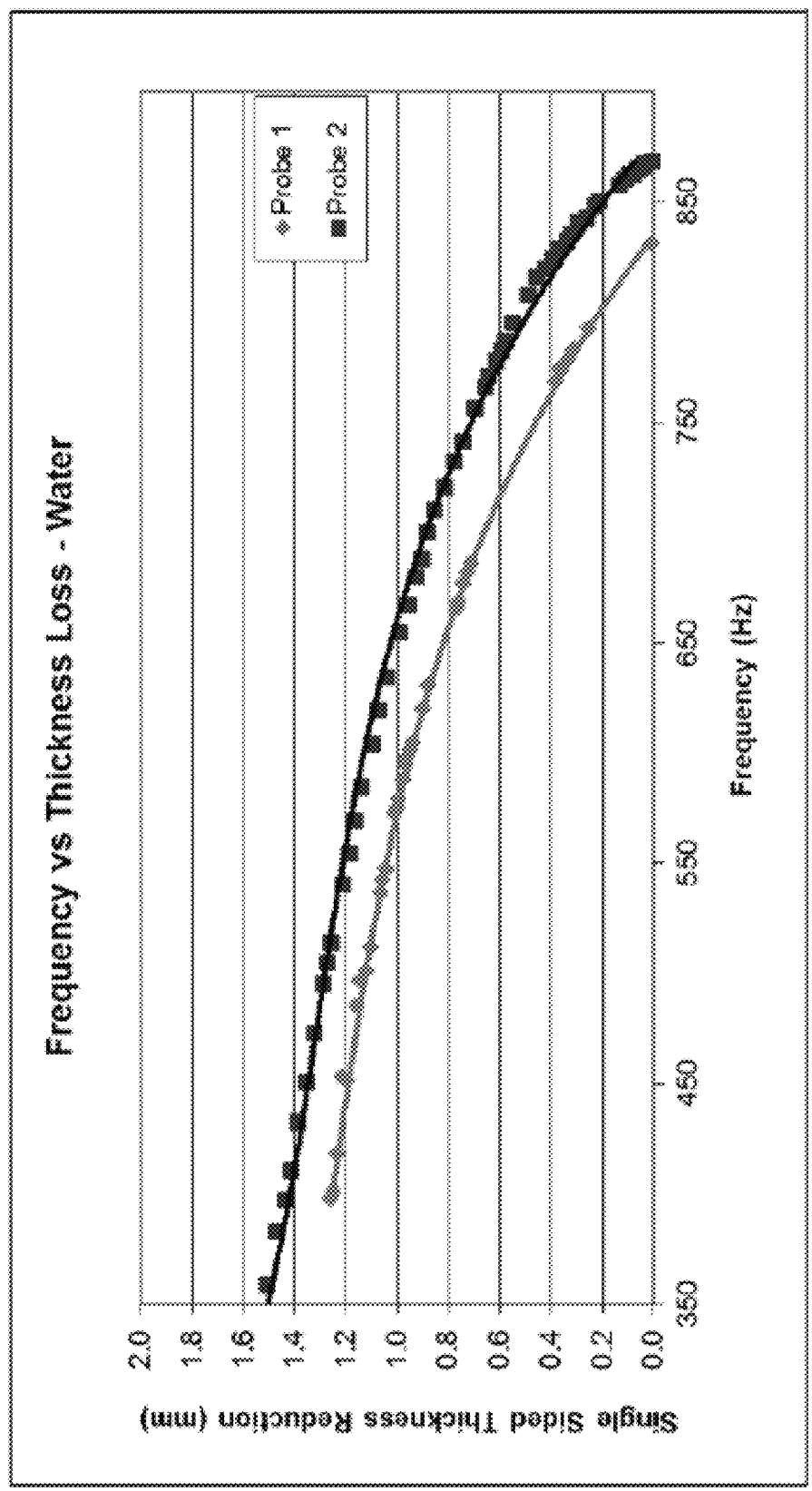
FIG. 4 illustrates calibration data obtained by extending the mass loss at the corrodible inserts almost to the point of failure in accordance with embodiments of the present disclosure.

While the frequency change appears subtle in the graph, the mass loss response was non-linear. In an aspect, the corrosion rate may be determined based at least in part on calibration data. For example, FIG. 4 illustrates calibration data obtained by extending the mass loss at the corrodible inserts almost to the point of failure. The calibration curve was repeated for two geometrically similar sensors.

Although there was a small absolute offset for the two devices, the shape of the curves is substantially identical and so determination of the initial resonant frequency is sufficient calibration to predict future corrosion. The calibration data illustrated in FIG. 4 demonstrates that frequency change versus initial frequency is a parameter that can be used to measure mass loss and that mass loss can be trended (or forecasted) to determine corrosion rate over time. In an aspect, tine mass loss may be converted to the tine's radial dimension change to more closely correlate to changes in thickness. In FIG. 3B, it can be seen that interpreting measurement sensor data (e.g., as illustrated in FIGS. 3A and 3B) using the using the calibration data results in a significant change in corrosion rate. At the end of the testing period from which the sensor data of FIGS. 3A and 3B were obtained, the probes were removed for examination. The physical measurement of the diametral change on the corrodible sensor was consistent with the calibration curve and the overall frequency change.

Figure 5:
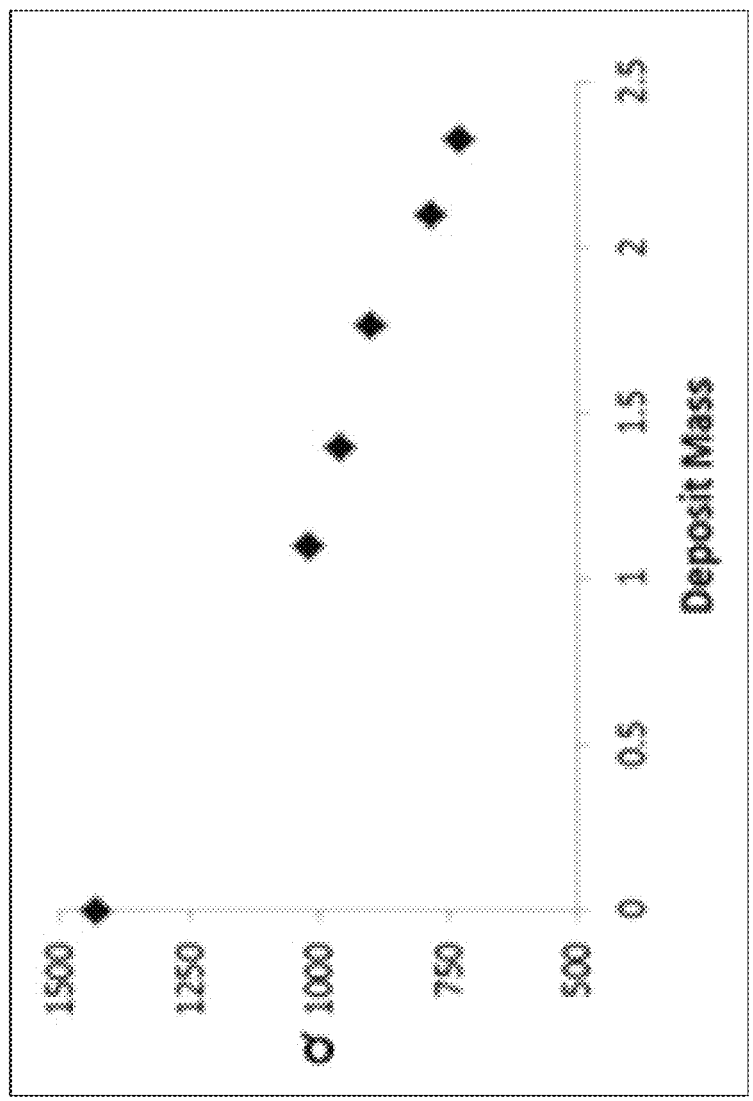
FIG. 5 illustrates the change in Q as a function of wax mass deposition according to embodiments of the present disclosure.

As explained above, the measurement sensor(s) of embodiments exhibit immunity to deposition on the corrosive stem, giving the sensor(s) an advantage over other resonating mass balances which are sensitive only to mass changes. Thus, measurement sensors of embodiments may make spurious corrosion measurements when the mass decrease due to corrosion is offset by mass increase due to oxidation produced from the corrosion process. In services with a temperature gradient across the measurement sensor (and/or reference sensor), deposition other than corrosive scale may occur on the forks (e.g., paddles, etc.). Such mass increase can confound the corrosion measurement. To compensate for such mass increases using a quality factor, Q, which represents a measure of energy dissipation defined as energy stored over energy lost per cycle, which may be extracted from the resonance spectrum. FIG. 5 shows the impact of deposition on Q or stated another way, FIG. 5 illustrates the change in Q as a function of wax mass deposition. The data illustrated in FIG. 5 indicates that Q can be used to quantify deposits which have accumulated on the sensor (e.g., a measurement sensor and/or a reference sensor). A decrease in Q (e.g., indicating an increase in energy lost per cycle) with increasing deposit indicates that a relatively soft epoxy deposit enables energy dissipation. This effect can then be used to correct the corrosion correlation with frequency for any deposit build-up on the tip of the sensor(s). In this way the sensors can also be used as a deposition sensor in fouling environments which are also corrosive. The correlation between Q and deposit mass may depend on the nature of the deposit and may need to be derived for specific cases where deposits of relatively constant composition are formed. The ability to use Q to quantify deposits may also depend on the nature of the environment around the sensors (e.g., liquid, or gas), which may affect Q differently. For example, in a gas environment where less energy is lost to damping and Q is relatively high, differences in Q caused by deposition may be apparent. However, in the presence of viscous liquids, Q may already be very low and the effect of deposits on energy dissipation can be lost. Thus, Q may drop in viscous liquid resulting in somewhat lower corrosion resolution due to broadening of the resonance peak. While, it has been shown that Q provides an effective parameter for measuring viscosity, this unintended deposition on the tip is atypical for many corrosion measurement applications.

Referring back to FIG. 1, after the parameter indicative of corrosion is determined, the metal loss device 140 may output information associated with the corrosion to an external device. For example, as shown in FIG. 1, the metal loss device 140 may be communicatively coupled to the controller 170 and the electronic device 180 via one or more gateways, such as the gateways 150, 160 shown in FIG. 1. In an aspect, the gateway 150 may be disposed in a first area and the gateway 160 may be disposed in a second area, as indicated by area separation line 106. For example, the first area (e.g., below area separation line 106) may be a hazardous area corresponding to the environment in which the pipeline 102 is present while the second area (e.g., above the area separation line 106) may be a safe area in which there are no hazardous substances or machinery present. In an aspect, the gateway 150 may provide access to a private network while the gateway 160 may provide access to a public network (e.g., the gateway 160 may be an Internet gateway providing access to the Internet). It is noted that discussion of the first area and second area has been provided for purposes of illustration, rather than by way of limitation and that other arrangements of the system components illustrated in FIG. 1 may be provided, such as by incorporating the controller 170 in the second area or situating the metal loss device and the gateway 150 in the second area.

The controller 170 includes one or more processors 172 and a memory 174. Each of the one or more processors 172 may be a CPU or other computing circuitry (e.g., a microcontroller, one or more ASICs, and the like) and may have one or more processing cores. The memory 174 may include ROM devices, RAM devices, one or more HDDs, flash memory devices, SSDs, other devices configured to store data in a persistent or non-persistent state, or a combination of different memory devices. The memory 174 may further store instructions 176 that, when executed by the one or more processors 172, cause the one or more processors 172 to perform the operations described herein with respect to the controller 170. Further, it is noted that in some aspects the frequency measurements provided by the sensor data may be provided to the controller 170 for processing, rather than the metal loss device 140, and in such embodiments, the controller 170 may be configured to perform operations described with reference to the metal loss device 140.

The controller 170 may be configured to record information provided by the metal loss device (or sensor data provided by the reference and measurement sensors) as one or more records in a database. The recorded information may be timestamped and associated with various locations of the pipeline 102 (e.g., locations corresponding to the locations of the measurement sensors and the reference sensors operating to provide the sensor data). As described in more detail below, the controller 170 may be configured to provide users of the system 100 with access to the sensor data and facilitate various operations to monitor corrosion of the pipeline 102.

The electronic device 180 may be a user device, such as a personal computing (PC) device, a laptop computing device, a tablet computing device, a smartphone, a personal digital assistant (PDA), or other device configured to perform the operations described in connection with the electronic device 180. Although not shown in FIG. 1, the electronic device 180 may include one or more processors and a memory. Each of the one or more processors of the electronic device 180 may be a CPU or other computing circuitry (e.g., a microcontroller, one or more ASICs, and the like) and may have one or more processing cores. The memory of the electronic device 180 may include ROM devices, RAM devices, one or more HDDs, flash memory devices, SSDs, other devices configured to store data in a persistent or non-persistent state, or a combination of different memory devices. The memory of the electronic device 180 may further store instructions that, when executed by the one or more processors of the electronic device 180, cause the one or more processors of the electronic device 180 to perform the operations described herein with respect to the electronic device 180. The electronic device 180 may further include a display device and one or more input/output devices (e.g., a keyboard, a stylus, a mouse, a touchscreen, and the like) configured to facilitate user interaction with information presented at the electronic device 180.

The electronic device 180 may be configured to provide a web browser or application that provides access to information associated with the sensor data generated by measurement and reference sensors of the system 100. For example, the electronic device 180 may be configured to provide access to one or more graphical interfaces presenting information indicating corrosion present in the pipeline 102 based on information recorded at the database by the controller 170. In an aspect, the controller 170 may be configured to analyze the corrosion data and generate one or more alerts that may be presented or provided to the user via the electronic device 180, such as via a text message, a multimedia message, an automated voice response system, an e-mail message, and the like. When the alert is received by the electronic device 180, one or more audible or visual alerts may be generated to notify the user that a notification or alert has been received. The graphical user interface and alerts provided by the electronic device 180 may facilitate real-time monitoring, as well periodic monitoring, of corrosion present within an environment, such as the pipeline 102.

Figure 6:
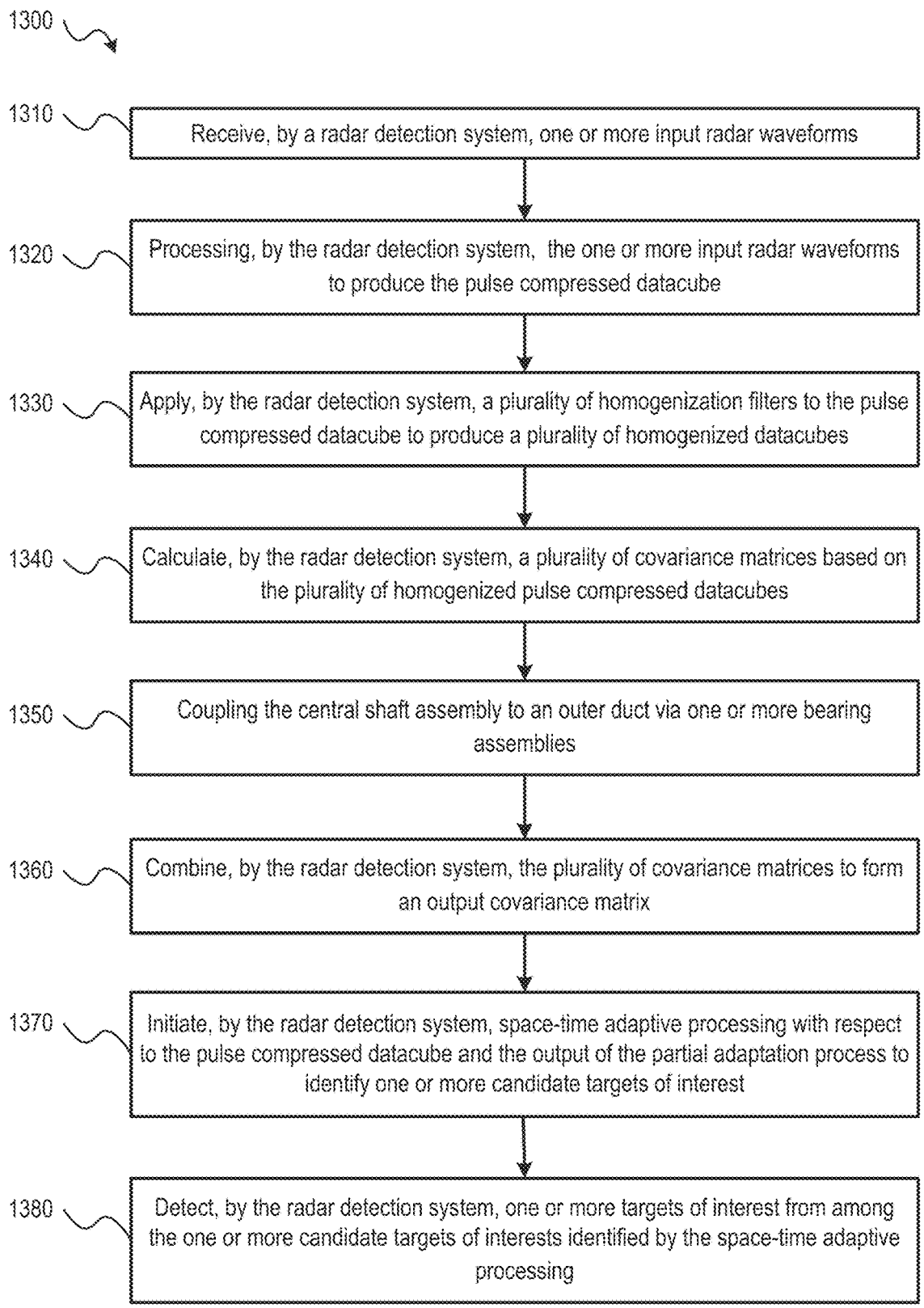
FIG. 6 is a flow diagram illustrating a method for detecting corrosion according to embodiments of the present disclosure.

Referring to FIG. 6, a flow diagram illustrating a method for detecting corrosion according to embodiments of the present disclosure is shown as a method 600. In an aspect, the method 600 may be stored as instructions (e.g., the instructions 146, 176, or instructions stored at a memory of the electronic device 180 of FIG. 1) that, when executed by one or more processors (e.g., the one or more processors 142, the one or more processors 172, or one or more processors of the electronic device 180 of FIG. 1), cause the one or more processors to perform steps of the method 600.

At step 610, the method 600 includes receiving, by a processor of a loss detector circuit, sensor data from a measurement sensor and a reference sensor. The loss detector circuit may correspond to the metal loss device 140 of FIG. 1 or the functionality of the loss detector circuit may be provided by another device, such as the controller 170 of FIG. 1 or the electronic device 180 of FIG. 1). As described above, the sensor data may include measurement data generated by a measurement sensor and reference data generated by a reference sensor. The measurement sensor may have a corrodible stem, as described above with reference to FIGS. 2B and 2C, and the reference sensor may not include a corrodible stem, as described above with reference to FIG. 2A.

At step 620, the method 600 includes determining, by the processor of the loss detector circuit, a change in frequency indicative of corrosion present in an operating pipe system based on the sensor data. In an aspect, the pipe system may be the pipeline 102 of FIG. 1. As described above, the measurement sensor and the reference sensor may be configured to be removably inserted into the pipe system and the sensor data may be received by the loss detector circuit while the pipe system is in use, which may facilitate monitoring of corrosion of the pipe system. It is noted that in some aspects, the method 600 may be utilized in applications that do not involve pipe systems, such as marine applications that are designed to monitor corrosion of components in the presence of other corrosive substances, such as salt water.

As described above with reference to FIGS. 1 and 3A/3B, the change in frequency indicative of corrosion present in the operating pipe system may be determined based on a difference in the measurement data received from the measurement sensor and the reference data received from the reference sensor. For example, the frequency indicated by the measurement data may be subtracted from the measurement data to determine the change in frequency indicative of corrosion present in the operating pipe system.

At step 630, the method 600 may include outputting information associated with the corrosion present in the operating pipe system via a graphical user interface. As described above, the loss detector circuit may be the metal loss detector 140 of FIG. 1 and the information may be provided to one or more external or remote devices, such as the controller 170 or the electronic device 180 of FIG. 1. The external or remote devices may be configured to present information associated with the change in frequency and the corrosion present in the pipe system to one or more users so that the health and structural integrity of the pipe system may be monitored in real-time. In some aspects, the measurement sensor and the reference sensor may be associated with a particular location within the pipe system and the graphical user interface may be configured to indicate a location within the pipe system where the corrosion is present. Based on the information presented via the graphical user interface, a determination may be made to replace at least a portion of the pipe system based on the corrosion, such as to replace a section of pipe associated with the location of the measurement and reference sensors when the corrosion reaches a threshold level (e.g., the thickness of the pipe system is reduced to a threshold thickness due to the corrosion).

The present disclosure demonstrates that the improved and enhanced sensors (e.g., the measurement and reference sensors disclosed herein) provide a useful life between five to ten years (for corrosion rates that average around 0.2-0.5 mm/y) with sensitivity to detect a corrosion rate change on the order of 0.1 mm/y within several days of measurement. As shown above, the sensors disclosed herein are configured to generate sensor data or signals based on vibration of a tuning fork whose frequency changes as its metal is lost (e.g., at the corrodible stem of the measurement sensor) due to corrosion. The frequency response of the tuning fork mass-spring system obeys Hooke's law in a simple harmonic oscillator relationship, which allows consistent measurement of mass loss due to corrosion despite the effects of scale formation and sensitivity due to temperature adjustment experienced by previous corrosion coupons and ER probes. The corrosion probe shown herein overcomes and exceeds all these limitations by combining a reliable sensor design and sensitivity for measuring fluid corrosivity and providing direct information on pressure boundary metal loss for asset monitoring.

The original design of the probe met partially the operational conditions found in typical crude oil stream pipes of 57.6 bar and 440° C. The probe assembly, when installed in the pipe, must comply with the technical specifications for flanges in Class 600. The modifications made to the original design were done on the basis of having an improved sensor that would be able to withstand the pressure and temperature requirements, but also a lifetime of 5 to 10 years and high sensitivity of 1 Hz as with the original design.

To explore different design modifications, Finite Element Analysis was carried out to determine the maximum resistance of the different components of the sensor when exposed to boundary operation conditions. Characteristic FEA result analysis is shown in the next section.

Figure 7:
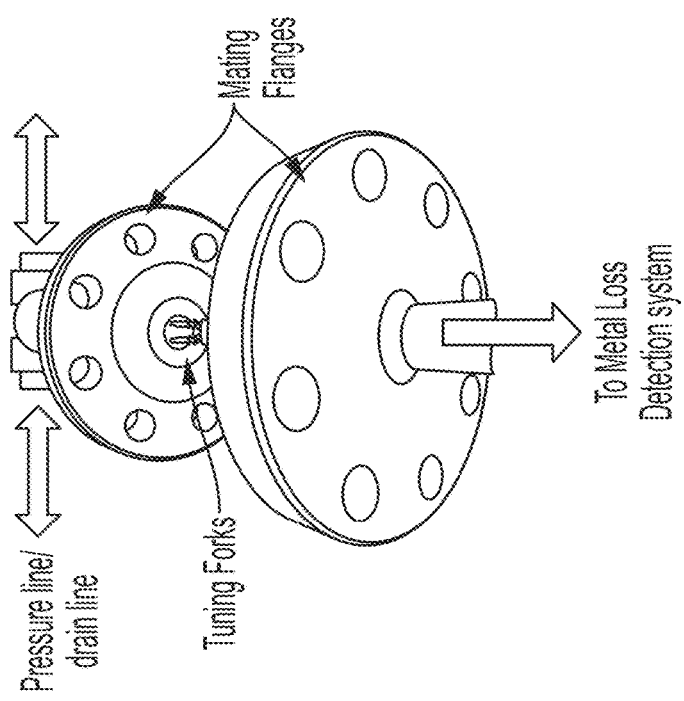
FIG. 7 illustrates the different components of the sensor assembly according to embodiments of the present disclosure.

After performing the FEA studies, the final sensor design was evaluated under hydrostatic conditions to find the maximum operation pressure before the sensor experienced any plastic deformation. A schematic of the hydro test set up is shown in FIG. 7 which shows the different components of the sensor assembly.

Figure 8:
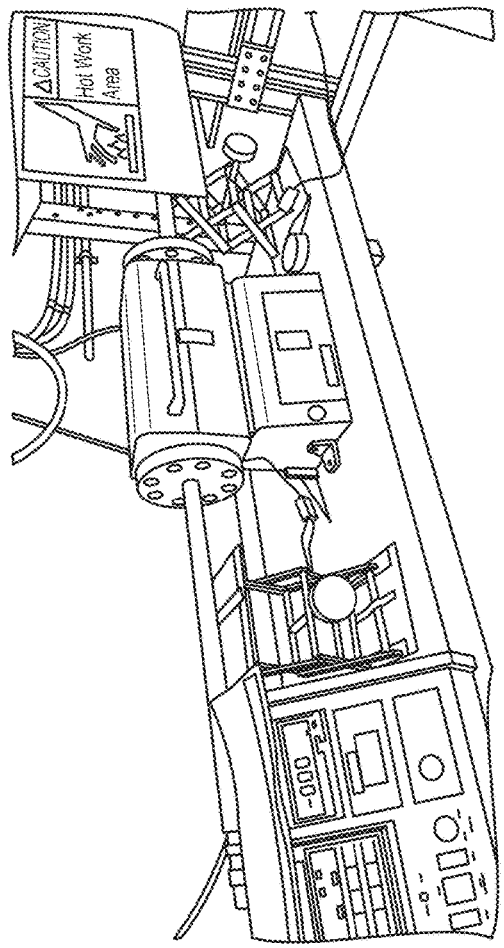
FIG. 8 illustrates the thermal cycling setup according to embodiments of the present disclosure.

The hydrostatic test was performed to reach a maximum test pressure of 86.4 bar under static conditions at 25° C. Once the hydrostatic test was performed, the sensor was exposed to a temperature cycling test to evaluate the changes in sensitivity as the temperature fluctuates. The target temperature was 260 to 400° C. (500 to 750° F.) which is a typical temperature range found in typical crude oil streams in refineries. Therefore, the new design of these example devices is intended to withstand temperatures as high as 440° C. (825° F.). The thermal cycling setup is illustrated in FIG. 8. The target temperature was 260 to 400° C., which is a common temperature range found in typical crude oil streams in refineries.

Figure 9:
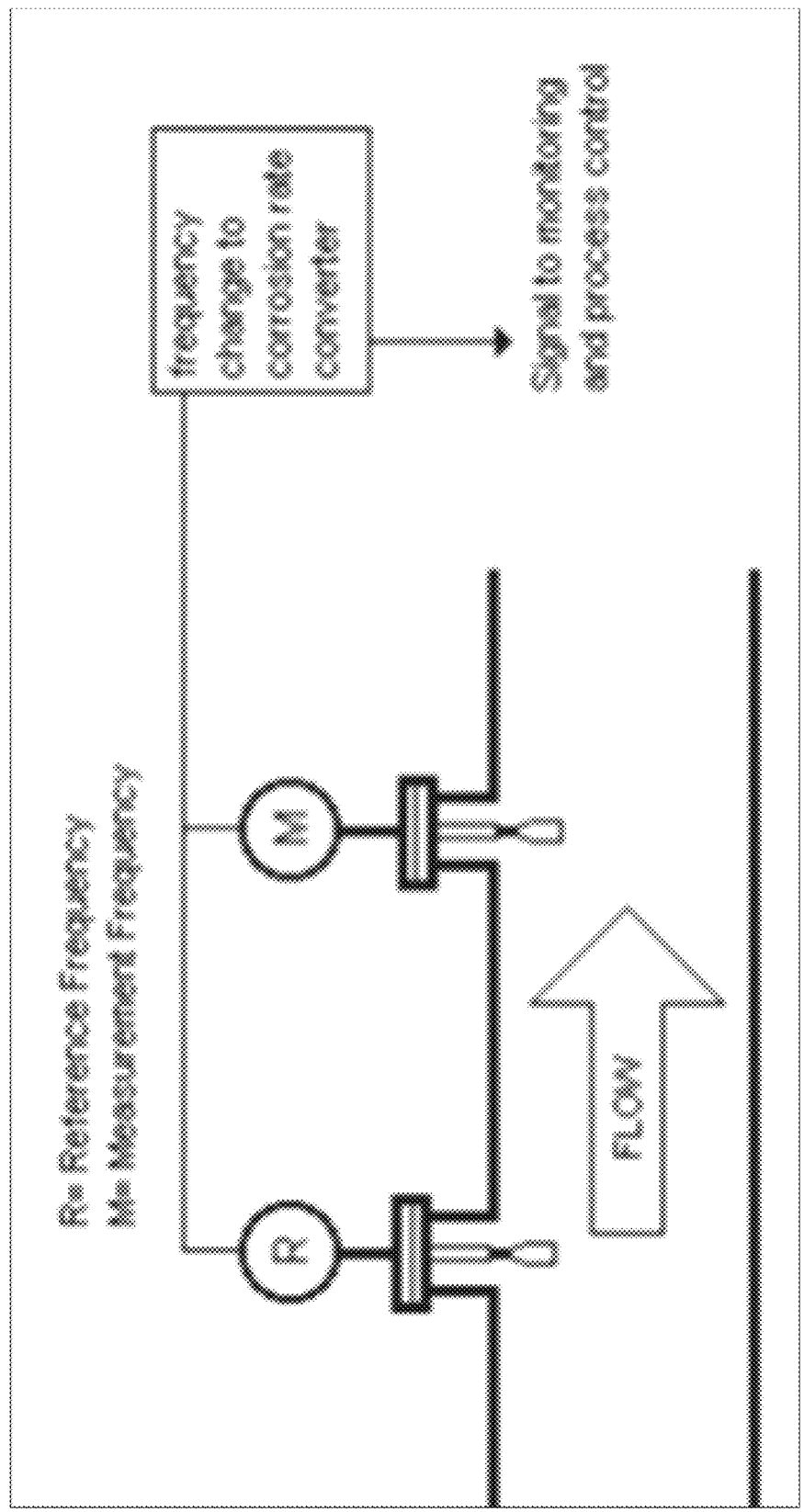
FIG. 9 illustrates exemplary field testing on a designated pipeline in a refinery facility according to embodiments of the present disclosure.
Figure 10A:
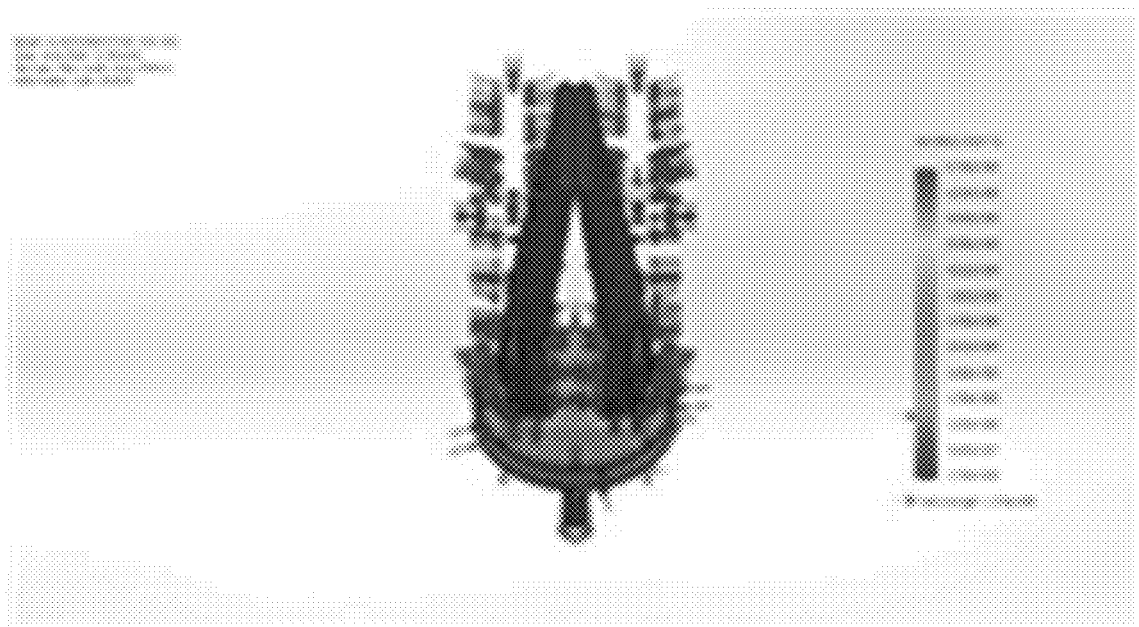
FIGS. 10A, 10B, 10C, 10D, 10E, and 10F illustrate characteristic results of the FEA under different stress conditions of the original design according to embodiments of the present disclosure.
Figure 10B:
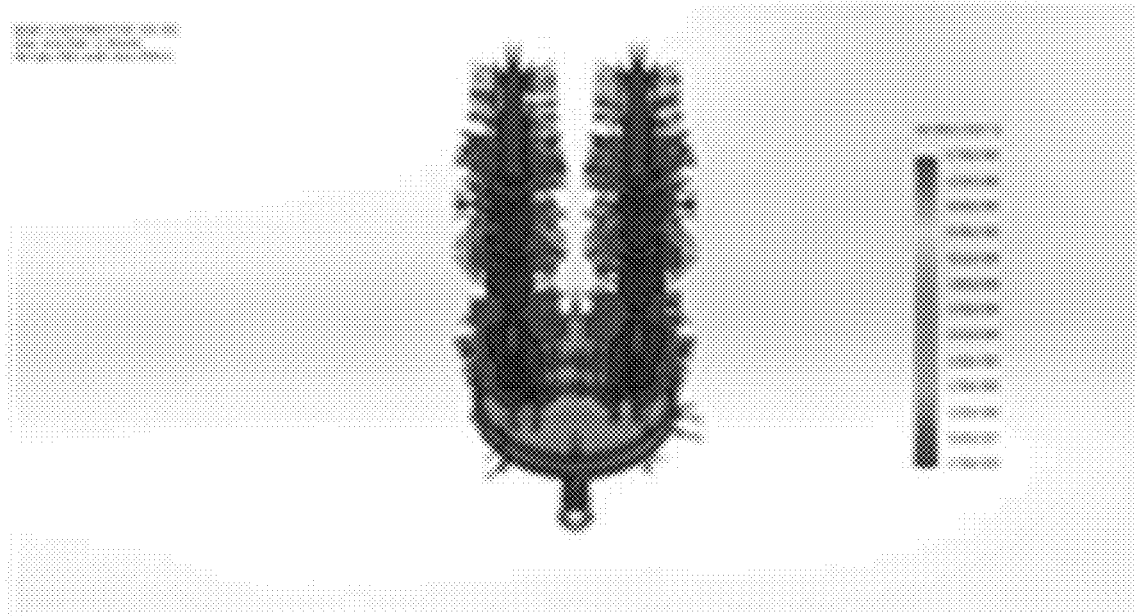
Figure 10C:
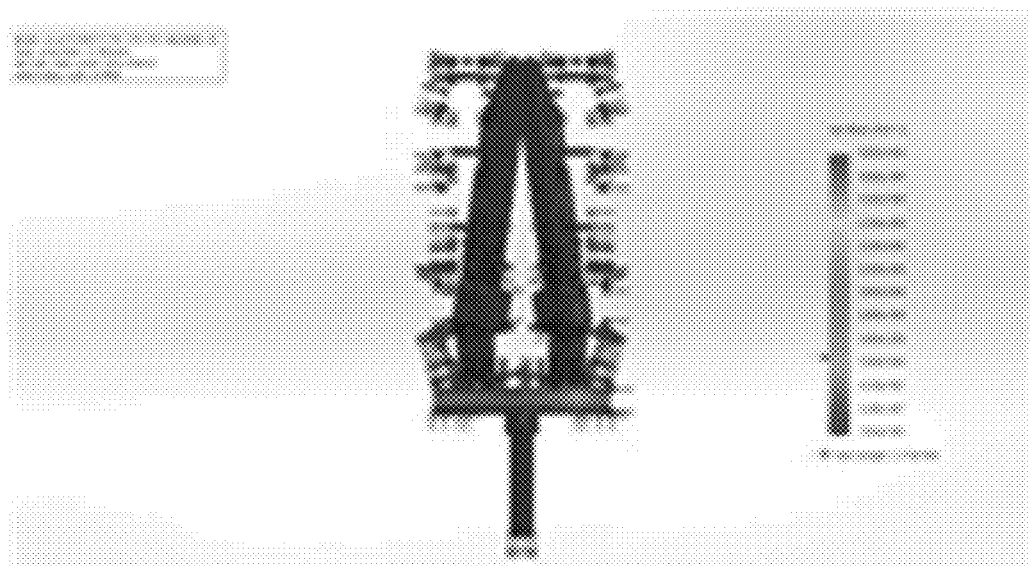
Figure 10D:
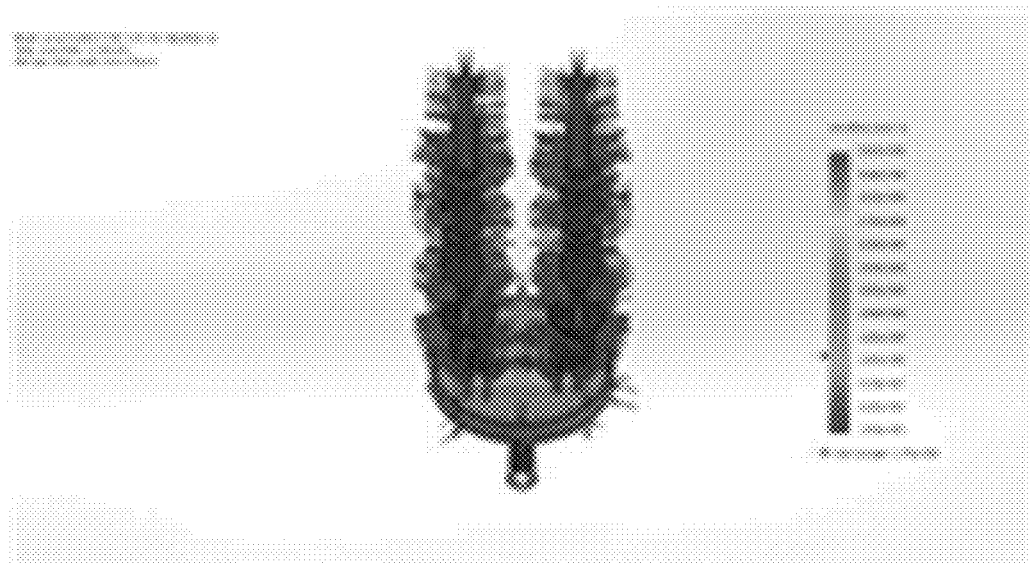
Figure 10E:
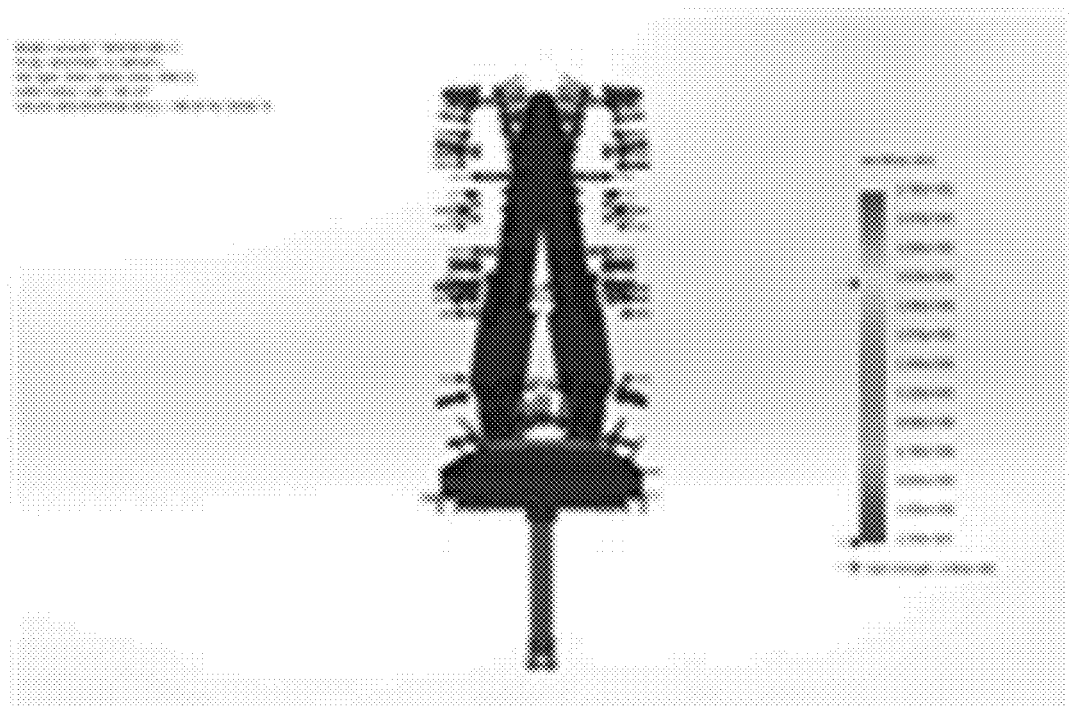
Figure 10F:
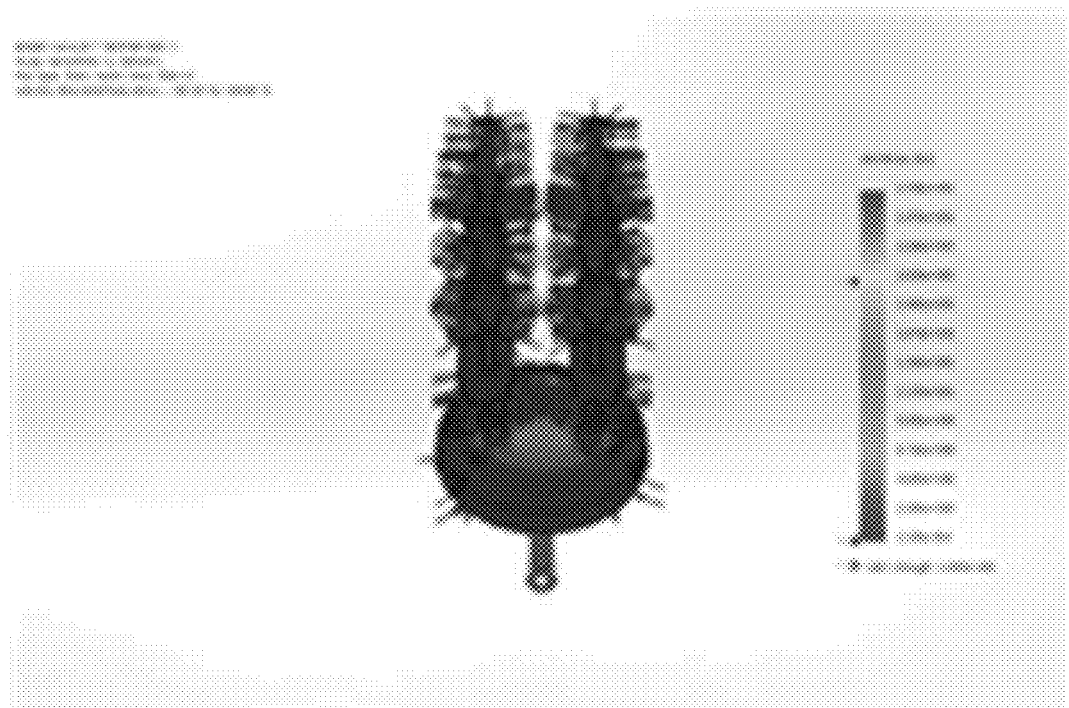

Finally, to complete the series of re-design activities and the conclusion of the laboratory test performance, the sensor was tested in the field using a similar configuration installation on a designated pipeline in a refinery facility as shown in FIG. 9.

Results

Numerical Simulations

From the results obtained in the laboratory and field tests of the first sensor design, some limitations were identified that prevented the sensors from meeting the lifetime and safe operation of the sensor under boundary operation conditions. Finite Element Analysis (FEA) was carried out on the original sensor design and all the subsequent modifications until the current sensor design was able to meet the required boundary operation conditions. Boundary operation conditions are primarily fluid flow velocity, pressure and temperature at which the corrosion sensor will be exposed. FIGS. 2A-2C illustrate aspects of the original, intermediate, and final sensor design as a result of the FEA study.

Comparison of the FEA also shows that the changes in the design (e.g., providing the dome-shaped diaphragm and extended corrosion element geometry) were optimized to reduce the risks, increase the safety factor, minimize the cost and/or increase the performance of the part/system while complying with the safety, lifetime and boundary operation conditions. FIGS. 10A-10F illustrate characteristic results of the FEA under different stress conditions of the original design (FIGS. 10A, 10B), intermediate modification (FIGS. 10C, 10D), and final design (FIGS. 10E, 10F) due to the assembly and fluid pressure effects during the testing of the vibrating corrosion probe design.

In addition to the changes in the design geometry and sizes, the stainless steel chosen for this product was SS317L, a billet which has higher strength relative to the SS316L cast which was used for the original designs.

Table 1 shows the maximum stresses levels reached by the different design as a result of the simulation under the same boundary operation conditions.

TABLE 1

Maximum stress level of the Tuning Fork; Boundary conditions: 86.4 bar (2160 psi) pressure on exposed surfaces, fixed surface at the joints to the pipe, pull in force from the sensing elements

|  | Original Design | Intermediate Modification Design | Final Design |
| --- | --- | --- | --- |
| Maximum VonMiss Stress | 98.6 ksi | 72.56 ksi | 27 ksi |

After completion of the FEA, a hydrostatic test was carried out to test the strength of the new and improved sensor design under the conditions mentioned in the experimental procedures. The section below show the results of the hydrostatic test.

Hydrostatic Test

This test has two levels, leak test to 1.5 times the maximum operation pressure of 86.4 bar (2160 psi) on the sealing components, and the burst test to 4 times the maximum operation pressure of 230.4 bar (5,760 psi) to observe any failures. The Hydro Test was performed; a maximum testing pressure up to 280 bar (7,000 psi) were obtained without the vibrating corrosion sensor showing any permanent deformation or visible damage.

Temperature Cycling

Although the use of a reference probe to compensate for temperature, pressure, viscosity, flow rate, and other boundary conditions variations has been shown to be very effective, any effort to reduce the sensitivity of the probes can serve the accuracy and consistency of measurement by reducing sources of noise. The original design has gone through rigorous thermal cycling to determine the thermal sensitivity and thermal drift levels. The new design has gone through similar thermal cycling as a comparison to the original design. Table 2 shows the results of this comparison:

TABLE 2

Thermal cycling results

|  | Original Design | Final Design |
| --- | --- | --- |
| Time required to eliminate Thermal Drift | 2 weeks (1 week of Cycling, 1 week of Hold) | 2 days (1 day of Cycling, 1 day of Hold) |
| Thermal Sensitivity | ~0.2 Hz/° C. | ~0.1 Hz/° C. |

The improvements mentioned in the Table 2, are primarily due to the changes in the geometry of the new probes (or sensors) and use of premium materials machined to the design versus the casted material used for the original design.

Validation: Numerical Corrosion Simulation and Experimental Laboratory Test

Figures 11A, 11B, 11C:
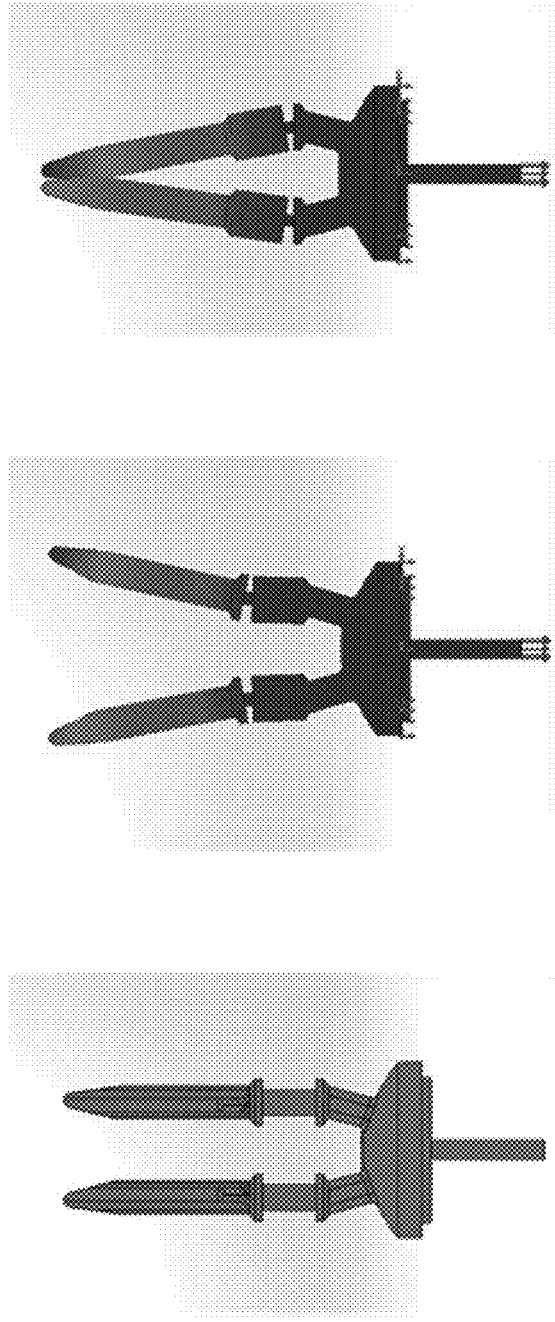
FIGS. 11A, 11B, and 11C illustrate different corrosion patterns for the corrodible stem according to embodiments of the present disclosure.
Figure 12:
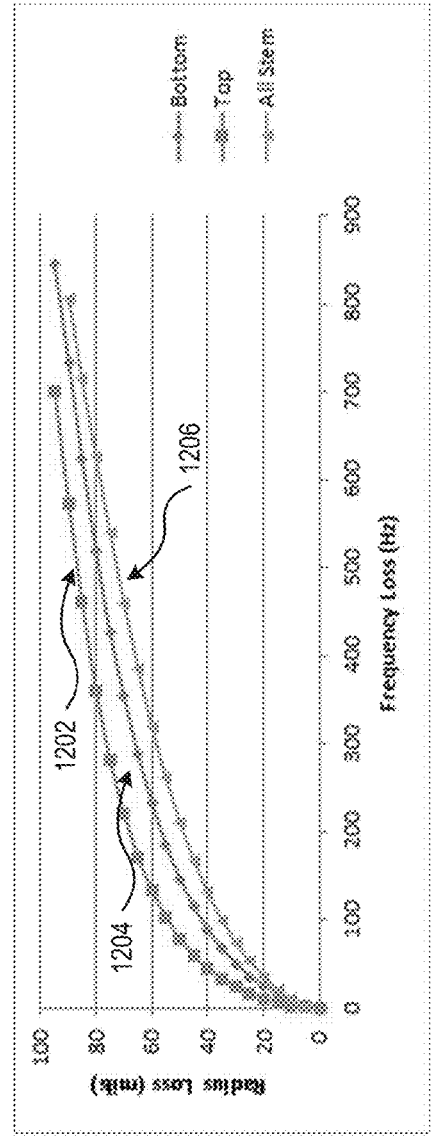
FIG. 12 illustrates differences in frequency measurements based on the predominate location of the corrosion on the stem according to embodiments of the present disclosure.
Figure 13A:
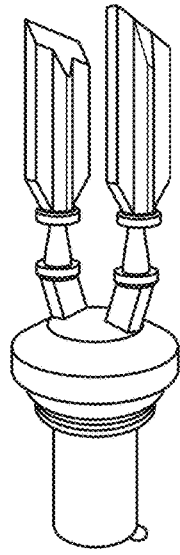
FIGS. 13A and 13B illustrate actual corrosion patterns observed during testing according to embodiments of the present disclosure.
Figure 13B:
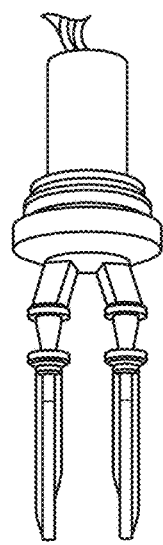

Three different corrosion patterns have been simulated for the corrodible stem. Actual corrosion performance is comparable to the top line shown in the graph below. FIGS. 11A-11C illustrate different corrosion patterns for the corrodible stem, where FIG. 11A illustrates corrosion along the entire stem, FIG. 11B illustrates corrosion predominately at the top of the stem, and FIG. 1C illustrates corrosion predominately at the bottom of the stem. FIG. 12 illustrates differences in frequency measurements based on the predominate location of the corrosion on the stem, with plot 1202 corresponding to corrosion at the top of the stem, plot 1204 corresponding to corrosion at the bottom of the stem, and plot 1206 corresponding to corrosion along the entire stem. FIGS. 13A and 13B illustrate actual corrosion patterns observed during testing.

Figure 14:
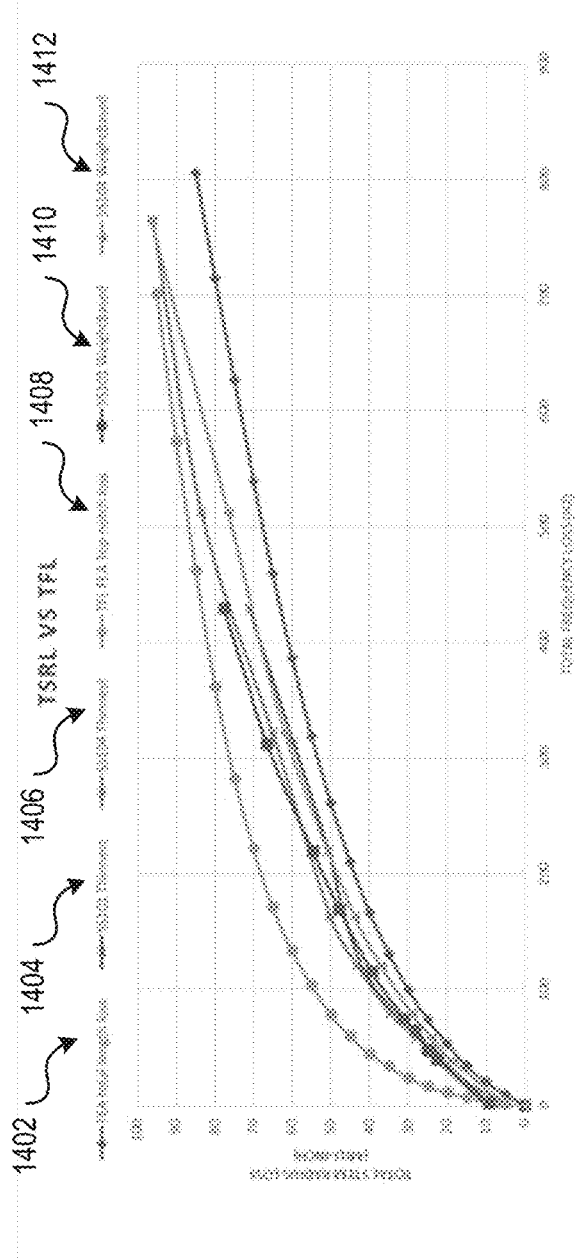
FIG. 14 is a diagram illustrating various plots of total stem radius loss (TSRL) versus total frequency loss (TFL) according to embodiments of the present disclosure.

FIG. 14 is a diagram illustrating various plots of total stem radius loss (TSRL) versus total frequency loss (TFL). In FIG. 14, plot 1402 represents a plot of an FEA total length loss, plot 1404 represents a plot of corrosion of a stem made from SS101, plot 1406 represents a plot of corrosion of a stem made from SS 104, plot 1408 represents a plot of corrosion for a TFL FEA top notch loss, plot 1410 represents a plot of corrosion for SS101 weight based stem, and plot 1412 represents a plot of corrosion for SS104 weight based stem.

From an analysis of the data obtained in the experimental tests, the design changes and the field tests it has been shown that: improvements provided by embodiments of the present disclosure were satisfactorily obtained by increasing the diameter of the corrodible section which resulted in an increased mechanical resistance and a longer sensor life; higher operation pressure was feasible to achieve due to the curved-dome shape diaphragm which provides better distribution of stresses below the maximum yield stress; and the new design demonstrated that the time required to eliminate the thermal drift was reduced to 1 day and the thermal sensitivity decreased from 0.2 Hz/° C. to 0.1 Hz/° C. These improvements may provide an increased corrosion detection sensitivity of the corrosion probes (e.g., the measurement and reference sensors described herein) during use. The sensors and systems disclosed herein enable online monitoring of corrosive environments, enabling the monitoring to be performed more frequently, minimizing the amount of time the system is taken offline, and is suitable for use in both conductive and non-conductive environments. The graphical user interfaces provide users with real-time visibility into system performance and enable rapid identification of areas within the system that are experiencing thinning due to the presence of corrosive forces.

Although embodiments of the present application and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps. Moreover, the scope of the present application is not intended to be limited to the particular embodiments of the process, machine, manufacture, composition of matter, means, methods and steps described in the specification.

The invention claimed is:

1. A tuning fork sensor comprising:
 a diaphragm disposed on a proximal end of the tuning fork, said diaphragm having a domed geometry defining a curved surface;
 a plurality of forks extending from the curved surface of the diaphragm toward the distal end of the tuning fork, wherein each fork of said plurality of forks further comprise a stub portion connected to said diaphragm and a stem portion comprising a corrosive material, and a paddle portion, and wherein said stub portion of each fork connects to said diaphragm at said curved surface.

2. The tuning fork of claim 1, wherein said diaphragm, said stub portion, and said paddle portion are formed of stainless steel.

3. The tuning fork of claim 1, wherein said corrosive material is carbon steel.

4. The tuning fork of claim 1, wherein said corrosive material is a same material as at least one material used to form a container in which said tuning fork is disposed.

5. The tuning fork of claim 1, wherein said tuning for has a resonant frequency that changes as the corrosive material corrodes.

6. A system for measuring pipeline corrosion, said system comprising:
 a measurement sensor comprising:
  a diaphragm disposed on a proximal end of the measurement sensor, said diaphragm having a domed geometry defining a curved surface; and
  a plurality of forks extending from the curved surface of the diaphragm toward the distal end of the measurement sensor, wherein each fork of said plurality of forks further comprises a stub portion connected to the diaphragm and a stem portion comprising a corrosive material, and a paddle portion, and wherein said stub portion of each fork connects to said diaphragm at said curved surface; and
 a loss detector circuit communicatively coupled to said measurement sensor, said loss detector configured to detect a change in frequency of said measurement sensor and to provide feedback relating to the change in frequency, wherein said change in frequency is indicative of corrosion present in an operating pipe system;
 wherein said measurement sensor is configured to be inserted into the pipe system and provide data to the loss detector circuit while the pipe system is in use.

7. The system of claim 6, further comprising:
 a reference sensor comprising:
  a second diaphragm disposed on a proximal end of the reference sensor, said second diaphragm having a domed geometry defining a curved surface;
  a second plurality of forks extending from the curved surface of the second diaphragm toward the distal end of the reference sensor, wherein each fork of said second plurality of forks further comprise a second stub portion connected to the second diaphragm and a second stem portion comprising a non-corrosive material, and a second paddle portion;
 wherein said reference sensor is configured to be inserted into the pipe system and provide reference data to the loss detector circuit while the pipe system is in use.

8. The system of claim 7, wherein said reference data is representative of changes in at least one of a temperature, a flow, and fluid viscosity within the pipe system.

9. The system of claim 7, wherein said loss detector circuit is communicatively coupled to said reference sensor.

10. The system of claim 9, wherein said loss detector circuit is configured to determine said change in said frequency indicative of corrosion present in the operating pipe system based on a difference in the data provided to said loss detector circuit by said measurement sensor and said reference data provided to said loss detector circuit by said reference sensor.

11. The system of claim 6, wherein said diaphragm, said stub portion, and said paddle portion are formed of stainless steel.

12. The system of claim 11, wherein said corrosive material is carbon steel.

13. The system of claim 6, further comprising:
a plurality of additional measurement sensors, each additional measurement sensor of the plurality of additional measurement sensors comprising:
  a diaphragm disposed on a proximal end of the measurement sensor, said diaphragm having a domed geometry defining a curved surface; and
  a plurality of forks extending from the curved surface of the diaphragm toward the distal end of the measurement sensor, wherein each fork of said plurality of forks further comprises a stub portion connected to the diaphragm and a stem portion comprising a corrosive material, and a paddle portion; and
a plurality of reference sensors, each additional reference sensor of the plurality of additional reference sensors comprising:
  a second diaphragm disposed on a proximal end of the reference sensor, said second diaphragm having a domed geometry defining a curved surface;
  a second plurality of forks extending from the curved surface of the second diaphragm toward the distal end of the additional reference sensor, wherein each fork of said second plurality of forks further comprise a second stub portion connected to the second diaphragm and a second stem portion comprising a non-corrosive material, and a second paddle portion;
wherein the additional measurement sensors and the additional reference sensors are disposed at different locations of the pipe system.

14. The system of claim 13, wherein the measurement sensor, the reference sensor, each additional measurement sensor of the plurality of additional measurement sensors, and each additional reference sensor of the plurality of additional reference sensors is associated with a particular location of the pipe system.

15. The system of claim 14, wherein said loss detector circuit is configured to provide said feedback relating to the change in frequency indicative of corrosion present in said operating pipe system to at least one of a controller and a user device for presentation via a graphical user interface, said graphical user interface configured to associate a particular change in frequency corresponding to a particular measurement sensor with a particular location of said operating pipe system.

16. A method comprising:
receiving, by a processor of a loss detector circuit, sensor data from a measurement sensor and a reference sensor, said sensor data comprising measurement data generated by said measurement sensor and reference data generated by said reference sensor, wherein each of said measurement sensor and said reference sensor comprise a diaphragm disposed on a proximal end and a plurality of forks extending from the curved surface of the diaphragm toward the distal end, said diaphragm of said measurement sensor and said diaphragm of said reference sensor each have a domed geometry defining a curved surface, wherein each fork of said plurality of forks further comprises a stub portion connected to the diaphragm at said curved surface, a stem portion, and a paddle portion, wherein said stem portion of said forks of said measurement sensor comprise a corrosive material and said stem portion of said forks of said reference sensor comprise a non-corrosive material;
determining, by said processor of said loss detector circuit, a change in frequency indicative of corrosion present in an operating pipe system based on said sensor data, wherein said measurement sensor and said reference sensor are configured to be inserted into said pipe system and the sensor data is received while said pipe system is in use.

17. The method of claim 16, further comprising determine said change in said frequency indicative of corrosion present in the operating pipe system based on a difference in said measurement data received from said measurement sensor and said reference data received from said reference sensor.

18. The method of claim 16, further comprising outputting information associated with said corrosion present in said operating pipe system via a graphical user interface.

19. The method of claim 18, further comprising configuring the graphical user interface to indicate a location within said graphical user interface associated with said corrosion present in said operating pipe system.

20. The method of claim 16, further comprising determining to replace at least a portion of said pipe system based on said corrosion present in said operating pipe system.

* * * * *

UNITED STATES PATENT AND TRADEMARK OFFICE
CERTIFICATE OF CORRECTION

PATENT NO. : 11,391,698 B2
APPLICATION NO. : 16/774701
DATED : July 19, 2022
INVENTOR(S) : Hossain Saboonchi et al.

It is certified that error appears in the above-identified patent and that said Letters Patent is hereby corrected as shown below:

In the Specification

At Column 14, Line number 62, delete "FIG. 1C" and replace with --FIG. 11C--.

Signed and Sealed this
Thirteenth Day of September, 2022

Katherine Kelly Vidal
*Director of the United States Patent and Trademark Office*